(12) United States Patent
Vadapandeshwara et al.

(10) Patent No.: US 12,131,139 B2
(45) Date of Patent: Oct. 29, 2024

(54) UNIFIED PIPELINE FLOW WITH COMMON AND PHASE-SPECIFIC PATHS

(71) Applicant: ORACLE FINANCIAL SERVICES SOFTWARE LIMITED, Mumbai (IN)

(72) Inventors: Rajaram N. Vadapandeshwara, Bangalore (IN); Tara Kant, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 117 days.

(21) Appl. No.: 17/577,497

(22) Filed: Jan. 18, 2022

(65) Prior Publication Data

US 2023/0161596 A1 May 25, 2023

(30) Foreign Application Priority Data

Nov. 22, 2021 (IN) .............................. 202121053528

(51) Int. Cl.
*G06F 8/35* (2018.01)
*G06F 8/41* (2018.01)
*G06F 9/38* (2018.01)
*G06F 9/451* (2018.01)
*G06F 9/455* (2018.01)
(Continued)

(52) U.S. Cl.
CPC .............. *G06F 8/4452* (2013.01); *G06F 8/35* (2013.01); *G06F 9/3869* (2013.01); *G06F 9/451* (2018.02); *G06F 9/45504* (2013.01); *G06F 21/53* (2013.01); *H04L 43/20* (2022.05)

(58) Field of Classification Search
CPC .... G06F 9/3869; G06F 9/451; G06F 9/45504; G06F 16/3344; G06F 40/14; G06F 21/53; G06F 8/4452; G06N 3/006; G06N 3/086; G06N 3/08; G16B 50/10; H04L 43/20
See application file for complete search history.

(56) References Cited

U.S. PATENT DOCUMENTS 8,856,126 B2 10/2014 Nagulakonda et al.
9,372,917 B1 6/2016 Saylor et al.
(Continued)

OTHER PUBLICATIONS

JP 5818351 (translation), Nov. 18, 2015, 21 pgs < JP_5818351. pdf>.*
(Continued)

*Primary Examiner* — Tuan A Vu
(74) *Attorney, Agent, or Firm* — Kraguljac Law Group, LLC

(57) ABSTRACT

Systems, methods, and other embodiments associated with associated with unified pipeline flow with common and phase-specific paths are described. In one embodiment, a method includes accepting, through a graphical user interface, a setting of a phase-specific link type for a link between nodes of a pipeline, wherein the phase-specific link type indicates that the link is associated with a particular phase; accepting, through the graphical user interface, a selection to execute the pipeline for the phase; parsing the pipeline to determine an execution set of nodes for execution in the phase based on the nodes being connected with links having either the link type or a default link type common to all phases; and executing the pipeline for the phase by executing the execution set of nodes, and not executing nodes not included in the set of nodes.

20 Claims, 8 Drawing Sheets

(51) Int. Cl.
*G06F 21/53* (2013.01)
*H04L 43/20* (2022.01)

(56) References Cited

U.S. PATENT DOCUMENTS

| | | |
|---|---|---|
| 9,507,567 B2 | 11/2016 | Vadapandeshwara et al. |
| 9,684,490 B2 | 6/2017 | Vadapandeshwara et al. |
| 10,042,956 B2 | 8/2018 | Vadapandeshwara et al. |
| 10,152,318 B2 | 12/2018 | Vadapandeshwara et al. |
| 10,534,636 B2 | 1/2020 | Vadapandeshwara et al. |
| 10,645,090 B2 | 5/2020 | Vadapandeshwara et al. |
| 10,969,929 B2 | 4/2021 | Vadapandeshwara et al. |
| 11,042,929 B2 | 6/2021 | Nagulakonda et al. |
| 11,068,306 B2 | 7/2021 | Vadapandeshwara et al. |
| 2004/0002818 A1* | 1/2004 | Kulp .................. G16B 50/10 702/20 |
| 2016/0379120 A1* | 12/2016 | Merdivan .......... G06F 16/3344 706/46 |
| 2021/0034980 A1* | 2/2021 | Xia ........................ G06N 3/08 |
| 2021/0055972 A1 | 2/2021 | Vadapandeshwara et al. |
| 2021/0150411 A1* | 5/2021 | Coenders ............... G06F 21/53 |
| 2021/0326717 A1 | 10/2021 | Mueller |
| 2021/0342725 A1 | 11/2021 | Marsden |
| 2022/0004897 A1* | 1/2022 | Jadon ................... G06N 3/086 |
| 2022/0124543 A1* | 4/2022 | Orhan ................... G06N 3/006 |
| 2022/0308737 A1 | 9/2022 | Chakraborty |
| 2023/0014465 A1* | 1/2023 | Sheng ..................... G06F 40/14 |
| 2023/0033886 A1* | 2/2023 | Goswami ................ H04L 43/20 |

OTHER PUBLICATIONS

Oracle Financial Services; Oracle Financial Services Model Management and Governance / Data Sheet / Version 1.0; Copyright 2020, pp. 1-6.

Oracle Financial Services; Oracle Financial Services Model Management and Governance / User Guide / Release 8.1.0.0.0—Feb. 2021; pp. 1-75.

United States Patent and Trademark Office, Final Office Action issued in U.S. Appl. No. 17/570,435 having a Date of Mailing of Jun. 13, 2023 (23 pgs).

United States Patent and Trademark Office, Non-Final Office Action issued in U.S. Appl. No. 17/570,435 having a Date of Mailing of Dec. 19, 2022 (19 pgs).

United States Patent and Trademark Office, Non-Final Office Action issued in U.S. Appl. No. 17/570,435 having a Date of Mailing of Feb. 15, 2024 (28 pgs).

United States Patent and Trademark Office, Notice of Allowance issued in U.S. Appl. No. 17/570,435 having a Date of Mailing of Aug. 6, 2024 (9 pgs).

* cited by examiner

UNIFIED PIPELINE FLOW WITH COMMON AND PHASE-SPECIFIC PATHS

CROSS REFERENCE TO RELATED APPLICATIONS

This disclosure claims the benefit of priority to INDIA Provisional Patent Application serial number 202121053528 filed Nov. 22, 2021, titled "Unified Pipeline Flow with Common and Phase-Specific Paths", having inventors Rajaram N. Vadapandeshwara, and Tara Kant, and assigned to the present assignee, which is incorporated by reference herein in its entirety.

BACKGROUND

In pipeline development of statistical and machine learning models, separate pipelines are developed for different deployment phases, such as experimentation, training, and scoring, which presents challenges at deployment and promotion to production and reduces explainability and auditability of the model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
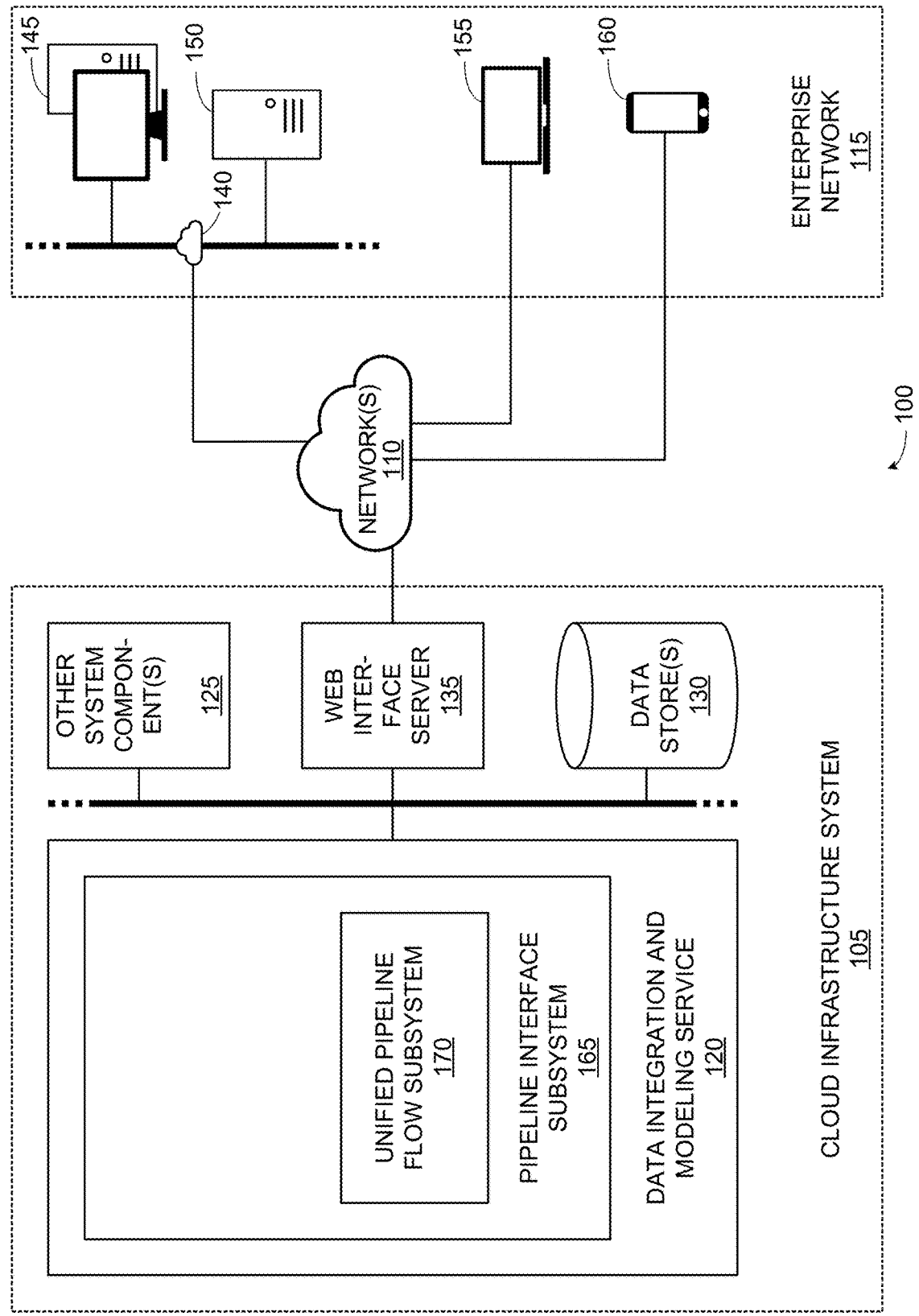
FIG. 1 illustrates one embodiment of a system associated with unified pipeline flow with common and phase-specific paths.

Systems, methods, and other embodiments described herein provide a unified pipeline flow with common and phase-specific paths, enabling dedicated paths or 'swim lanes' covering specific phases of a model development process to be included in a unified pipeline deployable, without modification, at any phase of model development.

Statistical and artificial intelligence (AI) machine learning (ML) modeling processes involve several phase-specific workflows such as, for example, a training phase, a testing phase, and a scoring phase. Models may be designed using scripting in a modeling or data-sciences platform with the differentiation across the workflow paths taken at different phases written into the code. Alternatively, a modeling platform may support multiple workflows to be designed, or use parameterization to let a task in a workflow know that the task either needs to perform some action or do nothing depending on a phase parameter, for example indicating whether the model is operating in a 'training', 'testing', or 'scoring' phase.

The systems, methods, and other embodiments described herein for unified pipeline flow with common and phase-specific paths present a single unified design paradigm that declaratively allows for modelers and analysts (non data-scientists, business domain users) to create a pipeline that (i) distinctly calls out those tasks/paths that are common across phases, (ii) breaks out those tasks/paths that take part in pipeline subsets specific to deployment phases (for example, training & testing, testing & scoring, stress-testing & back-testing, and any other deployment phase for a model) and (iii) provides visual explanation and monitoring of the reasons why the process flow followed a certain path. The single deployment process for execution flows (pipelines) enabled by the systems, methods, and other embodiments described herein for unified pipeline flow with common and phase-specific paths enables a high-degree of automation, especially in a cloud environment, and also simplifies manageability of the deployment. This is a significant productivity enhancer and opens up the process flows in modeling for introspection, audit, assessment, and understanding that hitherto was hidden in code or in cryptic decisioning logic that is not transparent to the business domain users. In one embodiment, these advantages are achieved in a model development pipeline interface using a declarative, configurable, no-code paradigm.

The systems, methods, and other embodiments described herein for unified pipeline flow with common and phase-specific paths thus enable: (i) a declarative design and modeling paradigm; (ii) a single unified flow that can represent common paths, distinct, deployment phase-specific paths, and real time monitoring and explainability; (iii) a unified development process (in a single pipeline artifact) that allows all phases and execution flows to be deployed once and across workspaces, providing a high degree of automation and manageability; (iv) visual explainability, introspection, and a low-code/no code interface for complex modeling, such as statistical or machine learning modeling. Advantageously, the systems, methods, and other embodiments described herein for unified pipeline flow with common and phase-specific paths eliminate any need for forking paths to be coded in the pipeline. Also, the systems, methods, and other embodiments described herein provide for a unified design paradigm that unites modeling design across all stages of development and deployment in a single, visually-represented pipeline. Additionally, deployment configuration is enabled to be automated based on the phase of the workspace to which the model pipeline is deployed.

No action or function described or claimed herein is performed by the human mind. An interpretation that any action or function can be performed in the human mind is inconsistent with and contrary to this disclosure.

Example Environment

FIG. 1 illustrates one embodiment of a system 100 associated with unified pipeline flow with common and phase-specific paths. In one embodiment, system 100 includes a cloud infrastructure system 105 such as Oracle® Cloud Infrastructure connected by the Internet 110 (or another suitable communications network or combination of networks) to an enterprise network 115. In one embodiment, cloud infrastructure system 105 includes various systems and components which include data integration and modeling service 120, other system components 125, data store(s) 130, and web interface server 135.

In one embodiment, data integration and modeling service 120 may be Oracle Financial Services' Model Management and Governance (MMG) tool for developing, deploying, and managing statistical, machine learning, computational, and simulation models. In one embodiment, other system components 125 may include cloud services that may be combined by data integration and modeling service 120 to build and run special purpose computing applications, such as statistical, machine learning, computational, and simulation models. In one embodiment, other system components 125 may further include user administration modules for governing the access of users to cloud infrastructure system 105.

Each of the components of cloud infrastructure system 105 is configured by logic to execute the functions that the component is described as performing. In one embodiment, the components of cloud infrastructure system may be implemented as sets of one or more software modules executed by one or more computing devices specially configured for such execution. In one embodiment, the components of cloud infrastructure system 105 are implemented on one or more hardware computing devices or hosts interconnected by a data network. For example, the components of cloud infrastructure system 105 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of cloud infrastructure system 105 are implemented by dedicated computing devices. In one embodiment, the components of cloud infrastructure system 105 are implemented by a single computing device, even though represented as discrete units in FIG. 1. In one embodiment, cloud infrastructure system 105 may be hosted by a third party, for example in an infrastructure-as-a-service (IAAS), platform-as-a-service (PAAS), or software-as-a-service (SAAS) architecture.

In one embodiment, the components of system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of system 100 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases, for example against databases held in data stores 130. The queries may be composed and executed in query languages compatible with the database and executed in a runtime environment compatible with the query language.

In one embodiment, remote computing systems (such as those of enterprise network 115) may access information or applications provided by cloud infrastructure system 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may access a pipeline graphical user interface (GUI) (also referred to as a data studio) for developing application logic. In one embodiment, the pipeline GUI is generated and operated by pipeline interface subsystem 165 of data integration and modeling service 120. In one example, communications may be exchanged between web interface server 135 and personal computer 145, server 150, remote user computers 155 or mobile device 160, and may take the form of remote representational state transfer (REST) requests using JavaScript object notation (JSON) as the data interchange format for example, or simple object access protocol (SOAP) requests to and from XML servers. The REST or SOAP requests may include API calls to components of cloud infrastructure system 105. For example, computers 145, 150, 155 of the enterprise network 115 may request creation, deletion, or modification of pipeline nodes or links through the pipeline interface subsystem 165.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to enterprise network 115 through network(s) 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connect to local area network 140 or network(s) 110 through wireless networks, such as cellular telephone networks or Wi-Fi. Users of the enterprise network 115 interface with cloud infrastructure system 105 across network(s) 110.

In one embodiment, data store 130 is a computing stack for the structured storage and retrieval of one or more collections of information or data in non-transitory computer-readable media, for example as one or more data structures. In one embodiment, data store 130 includes one or more databases configured to store and serve information used by cloud infrastructure system 105. In one embodiment, data store 130 includes one or more pipeline databases configured to store and serve information defining ordered execution of discrete tasks, for example as a graph data structure of metadata describing the tasks as nodes and the order as links of the graph. In one embodiment, data store 130 includes one or more Oracle® databases configured to store and serve the pipeline data structures. In some example configurations, data store(s) 130 may be implemented using one or more Oracle® Exadata compute shapes, network-attached storage (NAS) devices and/or other dedicated server device.

In one embodiment, data integration and modeling service 120 (such as the MMG tool) includes a unified pipeline flow subsystem 170 configured for implementing methods, functions, and other embodiments described herein associated with unified pipeline flow with common and phase-specific paths. In one embodiment, data integration and modeling service 120 is configured with logic (such as unified pipeline flow with common and phase-specific paths logic 730 shown and described with reference to FIG. 7) to implement methods, functions, and other embodiments described herein. For example, data integration and modeling service 120 may include pipeline interface subsystem 165 and unified pipeline flow subsystem 170. In one embodiment, pipeline interface subsystem 165 is configured to maintain one or more pipelines representing application logic as a set of task nodes linked in an order of execution, execute the pipelines (or pipeline segments), and present the pipelines for user review and editing through a canvas-style graphical user interface, as shown and described in further detail herein, for example with reference to FIGS. 2A and 2B. In one embodiment, unified pipeline flow subsystem 170 is configured to accept user inputs designating phase-specific portions of the pipeline to be executed during specific deployment phases, and common portions of the pipeline to be executed in all deployment phases, as shown and described in further detail herein.

Example Pipeline Interface Showing Common and Phase-Specific Paths

As used herein, a pipeline is a data structure, such as a graph data structure, representing logic of a computing application. In a pipeline, the nodes of the graph represent discrete, granular tasks or functions, where the links indicate order of operations of these tasks in the computing application, as well as inputs and outputs of the tasks. The pipeline may be represented visually in a pipeline GUI. Visual representation of a pipeline in a pipeline GUI may hide many of the operational details of the tasks in order to provide a visually uncluttered representation of the application logic. The GUI may enable the underlying operational details of the pipeline to be viewed and edited in response to user selection of the nodes and links. The GUI may also allow the user to add or remove tasks to the pipeline by creating or deleting nodes, and adding, removing, or rerouting links in response to user inputs. The pipeline GUI thus provides a low-code (or no-code) data sciences platform for creating computing applications.

In one embodiment, pipelines are stored in a data repository, such as a graph database, for example in data store 130. The pipelines include information that define the links between nodes in the pipeline. The pipelines include information that define the task performed by the node, such as either (i) computer-executable code for performing the task or (ii) a link to an external execution of the task, such as an API call to a computational notebook to execute a paragraph of computer-executable code for performing the task. A computational notebook, or notebook, as used herein, refers to an interactive document for combining paragraphs (or cells) of executable code, data visualizations, and other artifacts which is executable by a kernel, such as notebooks in Oracle® Data Studio, Jupyter, Zeppelin, Google Notebook Service, and SageMaker Notebook.

Figure 2A:
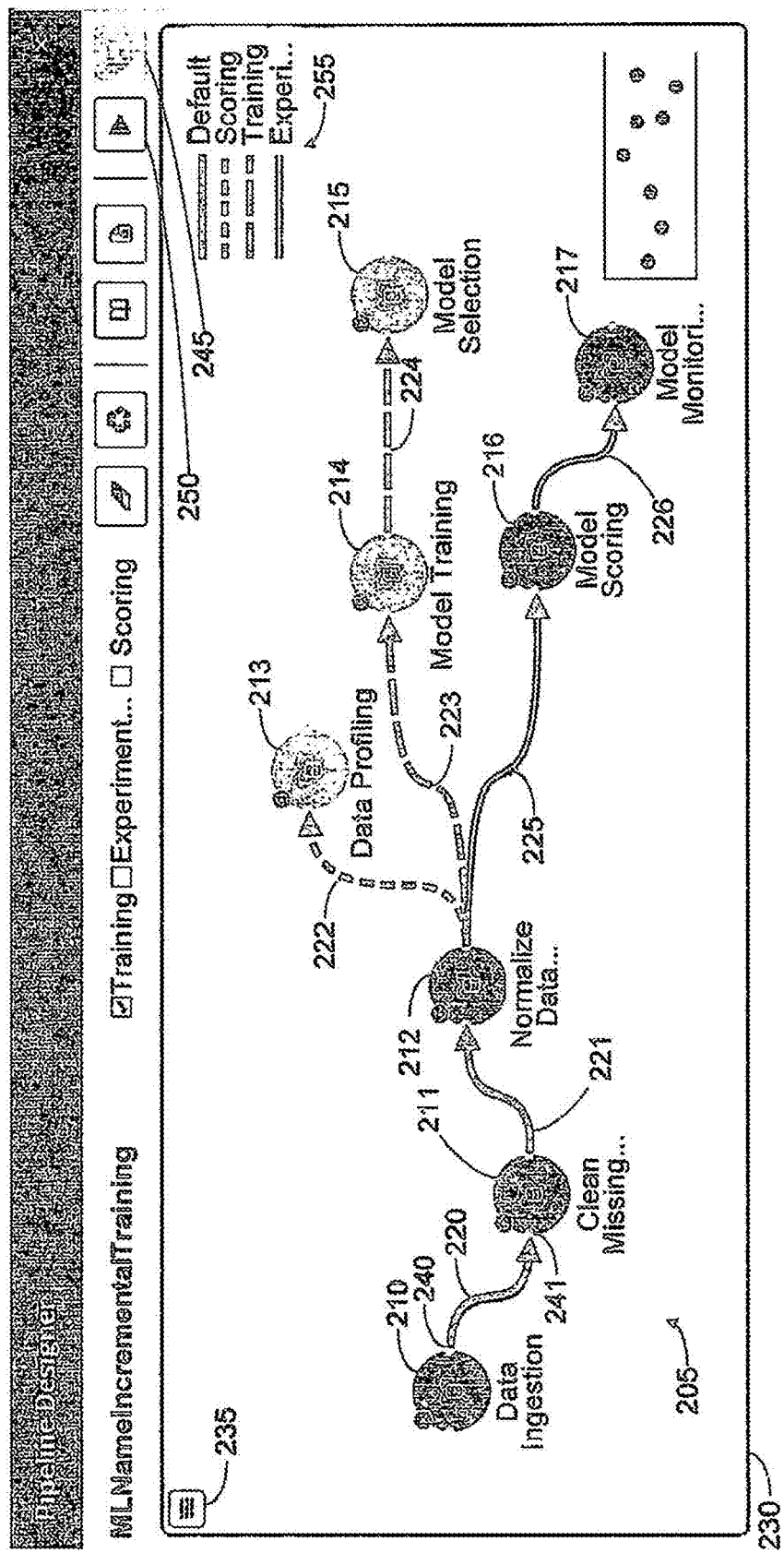
FIG. 2A illustrates one embodiment of a pipeline GUI associated with unified pipeline flow with common and phase-specific paths.

FIG. 2A illustrates one embodiment of a pipeline GUI 200 associated with unified pipeline flow with common and phase-specific paths. Pipeline GUI 200 displays an example pipeline 205 made up of a set of nodes 210-217 and links 220-226 that interconnect the nodes in a particular order on a canvas 230. Nodes may be added to the pipeline by dragging template nodes from a menu (for example, accessed through selection menu button 235) and dropping the node onto canvas 230. Links between nodes may be created by clicking on a first node connection point (such as connection point 240) and dragging the cursor to a second node connection point (such as connection point 241) to form a new link. Nodes and links may also be deleted from the pipeline 205 using GUI 200, for example by selecting the node or link in canvas 230 and selecting a delete option. Changes to example pipeline 205 may be saved in response to selection of a save button 245. Example pipeline 205 may be caused to execute in response to selection of a pipeline execute button 250.

As used herein, the term "common" indicates that a feature relates to, belongs to, is shared by, or is usable in more than one development phase. In one embodiment, links or nodes may be common to all deployment phases, forming a common path in the pipeline that is executed regardless of deployment phase. Example pipeline 205, for example, includes a common path shown by nodes 210-212 and links 220-221 that is followed regardless of selected development phase. In one embodiment, pipeline GUI 200 displays the links of the common path as solid lines of a first color, and the nodes of the common path are displayed in the first color. In one embodiment, this is indicated in a legend 255 displayed in canvas 230.

As used herein, the term "phase-specific" indicates that a feature relates to, belongs to, or is usable in one particular development phase, and is not shared with other development phases. In one embodiment, links or nodes may be associated with a specific deployment phase, forming one or more phase-specific paths in the pipeline that are executed in the deployment phase with which the path is associated, but not in other deployment phases. Example pipeline 205, for example, includes three phase-specific paths: an experimentation path shown by nodes 216-217 and links 225-226 that is followed only for an experimentation phase of development; a training path shown by nodes 214-215 and links 223-224 that is followed only for a training phase of development; and a scoring path shown by node 213 and link 222 that is followed only for a scoring (production) phase of development. In one embodiment, pipeline GUI 200 displays the links of each phase-specific path as dotted lines of specific color. In one embodiment, the definition of the different link types is indicated in legend 255.

In one embodiment, multiple common paths and multiple phase-specific paths for the same phase may also be present in in a pipeline. In one embodiment, there is at least one deployment phase: a default phase, with which paths may be automatically associated unless user input associates the path with a different phase. Paths with "default" link types are executed in all phases. In one embodiment, common paths are associated with the default phase, and links of the common paths are of a default phase type. While example pipeline 205 shows only phase-specific paths for three deployment phases, in one embodiment, phase-specific paths may be established for any number of deployment phases. In one embodiment, pipeline interface 165 is configured to have link types for default, experimentation, training, and scoring (production) phases. In one embodiment, the user may define link types for additional phases, for example in response to selection of an option under menu button 235. As part of the definition process, the user may name the link type for the phase. In one embodiment, a phase-specific path is associated with a specific deployment phase, and links of a phase-specific path are of a type indicating the deployment phase. Other possible user defined link types in addition to experimentation, training, and production, may include a manual process, or a triggered process launched in response to some external inputs, or whatever type the user chooses. In one embodiment, there may be 1-n different paths, all of which except default, experimentation, training, and production are user-definable.

Figure 2B:
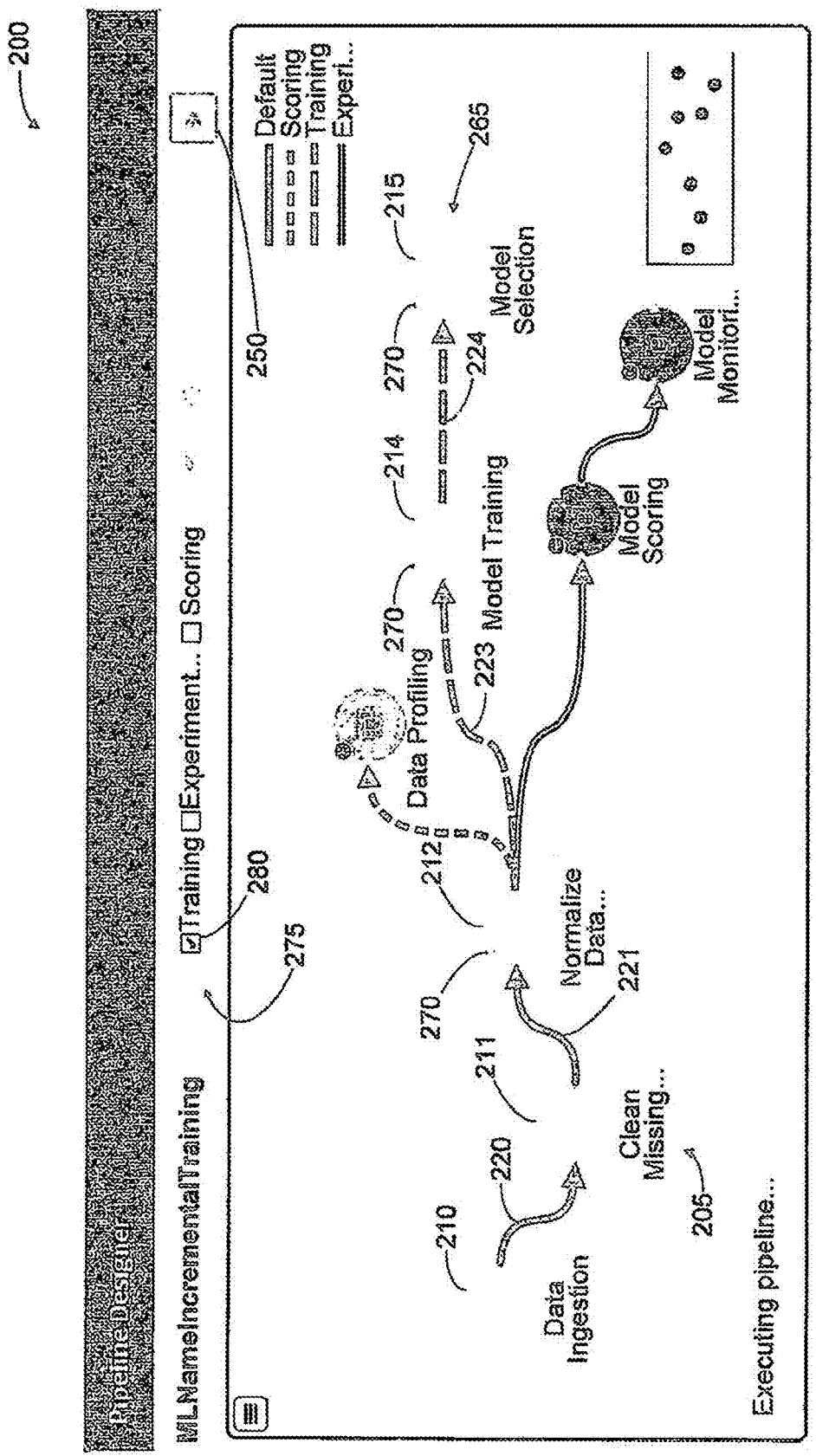
FIG. 2B illustrates one embodiment of a pipeline GUI associated with unified pipeline flow with common and phase-specific paths in which the execution path for a user-selected phase is highlighted.

In one embodiment, one or more of the phase-specific paths may be selected for execution of the pipeline by the user. FIG. 2B illustrates one embodiment of a pipeline GUI 200 associated with unified pipeline flow with common and phase-specific paths in which the execution path 265 for a user-selected phase is highlighted. In one embodiment, the path of execution 265 for the current execution is highlighted, and the other paths that are not being executed may be dimmed out or greyed out. While the selected pipeline path 265 is being executed, the currently executing nodes may be marked with an execution in progress marker 270. The results of an executing node may be viewed in real time by selecting a menu option of the node, which will display the output of the node, for example in a pop-up window that displays either the real-time outputs or real-time graphs and charts of the outputs. These real time outputs may also be accessed by external applications through an API of the pipeline node.

In one embodiment, the user can select the phase-specific paths for execution from a menu. In pipeline GUI 200, the execution path in example pipeline 205 is selected from menu 275 for example by selecting or de-selecting check boxes associated with development phases. For example, the check box for the "training" execution path 280 is selected. In one embodiment, following user definition of a link type for a phase causes that phase to appear for selection in menu 275. In one embodiment, selection of an execution path causes pipeline GUI 200 to highlight the common and phase-specific paths in the pipeline that are executed as part of the execution path, for example by changing the color of nodes in that path. For example, in response to selecting the "training" check box 280, pipeline GUI highlights the "training" path, including the nodes and links of the common path 210-212 and 220-221, and the nodes and links of the "training" phase-specific path 214-215, 223-224. The highlights thus indicate the execution path for the selected phase. In one embodiment, in response to selection of pipeline execute button 250, the nodes in the execution paths for the selected phase(s) are executed by cloud infrastructure system 105, and the nodes in the execution paths for the un-selected phases are not executed. Thus, selection 280 of the training execution path from menu 275 causes the common and phase-specific paths associated with the training link type to be those executed in response to selection of pipeline execute button 250, while the phase-specific paths associated with the experimentation, scoring (and any other) link types are not executed.

In one embodiment, the unified pipeline with phase-dependent forking paths (or workflows) gives a complete view of the modeling process at all stages of development.

The whole pipeline, including the training and experimentation process, may be deployed "as-is" to the production environment, enabling an observer to know that the production model was developed with the training and experimentation paths (for auditability and other reasons). This advantage is not available where production, training, and experimentation workflows are separate: there is no way to associate different phases with certainty, for example to be certain that a production workflow was developed using a particular training workflow.

The systems, methods, and other embodiments described herein enable flexible forking (branching or switching) and reconfigurability at runtime by parameterizing the forking, which would otherwise have to be hard-coded into the functional code of the node.

Automatic Deployment-Based Configuration

Figure 3:
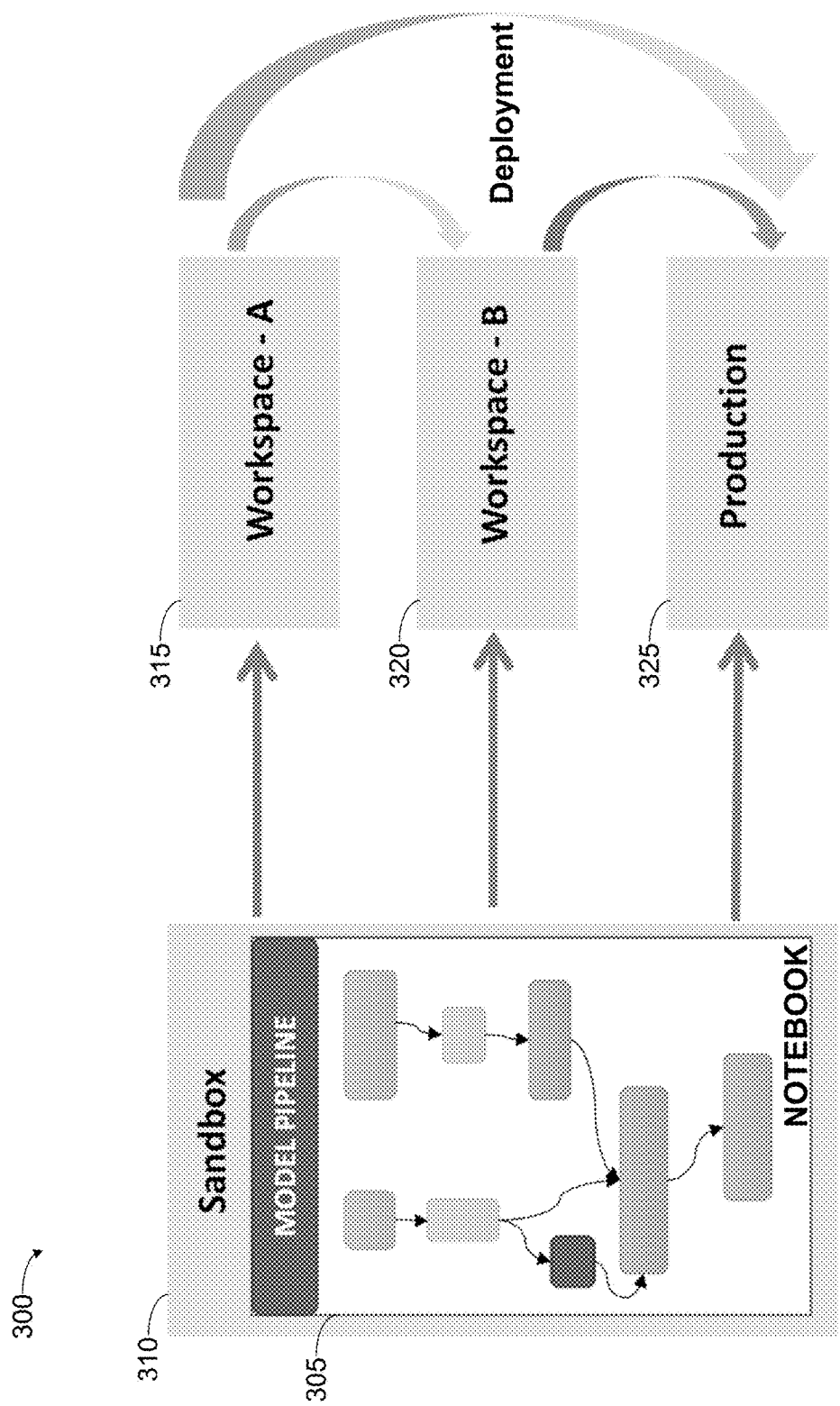
FIG. 3 illustrates one embodiment of deployment of an example pipeline from a first workspace into various other workspaces associated with unified pipeline flow with common and phase-specific paths.

FIG. 3 illustrates one embodiment of deployment 300 of an example pipeline 305 from a first workspace 310 into various other workspaces 315, 320, 325 associated with unified pipeline flow with common and phase-specific paths. A workspace is a virtual private environment that keeps objects, data, and applications separate from those of other workspaces. Workspaces have unique identifiers, and further have two attributes: (i) a set of data source definitions; and (ii) a type of workspace as to whether the workspace is a sandbox or production environment. In one embodiment, these two attributes affect execution of the pipeline. In one embodiment, example pipeline 305 is initially developed or created in first workspace 310. In one embodiment, example pipeline 305 may be deployed from first workspace 310 to any other workspace 315, 320, 325 (or from any one of the other workspaces to any other workspace, for example from workspace A 315 to workspace B 320 or production workspace 325) without modification to example pipeline 305. Configuration of pipeline features specific to the workspace are handled declaratively at runtime.

In one embodiment, the data source definitions include 1-m data sources. The data sources may be, for example, a database schema (such as an Oracle, MySQL, Hive, or H2 database), a file system (such as new technology file system (NTFS) or the extended file system family (ext, ext2, ext3, ext4)), a distributed file system (such as Hadoop distributed file system (HDFS)), or any other data source. The connections to these data sources are included in the data source definitions for the workspace. Thus, in one embodiment, data sourcing (or ingestion) nodes (such as node 210) of a pipeline include hooks to the data sources of the workspace, rather than hard-coded connection to the data source. A hook takes data connection parameters of a particular data source from the workspace to establish the connection to the data source. In this way, for example, where a pipeline (such as example pipeline 305) is deployed in a first workspace (for example, workspace A 315) with data source definition for data source 1 being database A, a data ingestion node of the pipeline with a hook to data source 1 will retrieve information from database A, and where the pipeline is deployed in a second workspace (for example, workspace B 320) with data source definition for data source 1 being database B, the data ingestion node of the pipeline with the hook to data source 1 will retrieve information from database B. This hook and defined data source structure of the workspace is agnostic as to the underlying data source, and thus enhances the portability and deployment automation of a pipeline. Thus, when a pipeline is run in a first workspace, the pipeline will be connected to defined data sources of the first workspace, and when a pipeline is run in a second workspace, the pipeline will be connected to defined data sources of the second workspace.

In one embodiment, phase-specific pipeline paths may be automatically enabled or disabled based on whether the workspace is a sandbox or production environment. Put another way, the system may automatically enable execution of a path of the pipeline having links of a given link type (that associates the link with a phase) based on the type of workspace in which the pipeline is deployed. Where the workspace is a sandbox environment (such as workspaces 310, 315, 320), only common, experimentation, testing, (and user-defined phase) paths are enabled, and the scoring paths are disabled. In this sandbox configuration, in response to a command to run the pipeline, such as a command from an external application or in response to selection of button 250, the common, experimentation, testing, (and user-defined phase) paths will be run, and the scoring paths will not be run. The user may override this in a sandbox workspace, for example by selection of an option to run the production path at runtime. Where the workspace is a production environment (such as production workspace 325), only common and scoring paths are enabled, and the experimentation, testing, (and user-defined phase) paths are disabled. In this production configuration, in response to a command to run the pipeline, the common, and scoring paths will be run, and the experimentation, testing, (and user-defined phase) paths will not be run. The user may override this in a sandbox workspace, for example by selection of an option to run one or more of the experimentation, testing, (and user-defined phase) paths at runtime.

Thus, advantageously, when deploying unified pipelines with common and phase specific paths as shown and described herein, there is no need to publish individual pipelines for training or scoring purposes. The complete pipeline may be moved across workspaces. Run-time parameters may be used to execute the chosen path for experimentation, training, scoring, or other user-specified phases (such as a manual process path, a triggered (by external input) pipeline path, or a what-if analysis pipeline path). Approvers and reviewers are allowed and enabled to have complete overview of a model development process. Further, execution of experimentation and training paths are automatically restricted in production environments. In one embodiment, a pipeline can therefore be copied, cloned, deployed or otherwise moved into a new workspace environment, or from a development sandbox environment to a production environment without changing the pipeline at all.

Runtime Parameters

Figure 4:
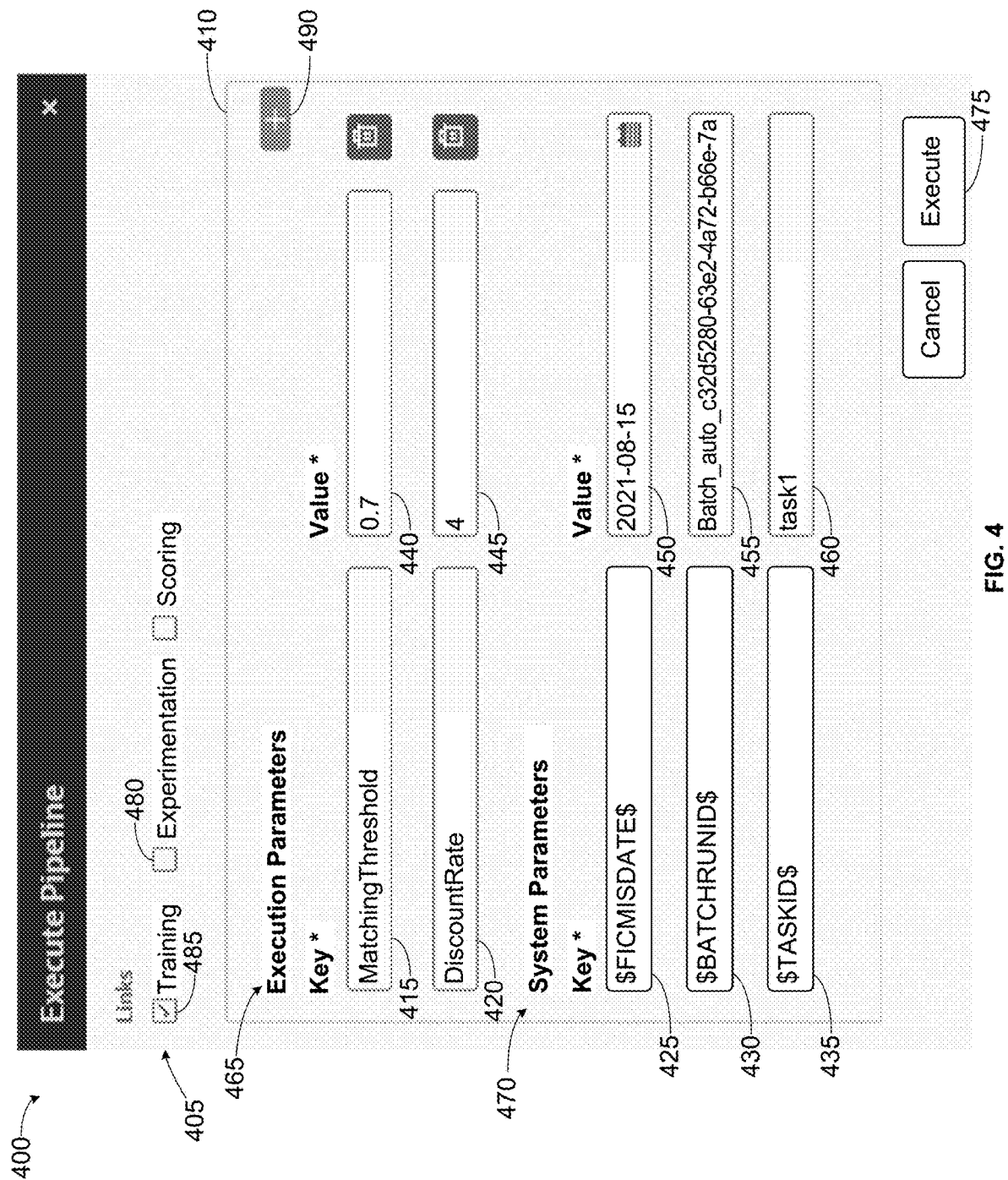
FIG. 4 illustrates one embodiment of a menu GUI for selecting execution options for a pipeline associated with unified pipeline flow with common and phase-specific paths.

FIG. 4 illustrates one embodiment of a menu 400 GUI for selecting execution options for a pipeline associated with unified pipeline flow with common and phase-specific paths. In one embodiment, menu 400 is displayed in response to selection of button 250. A user may select the sets of links (paths) of a particular type that the user wants to execute from links submenu 405. Links submenu 405 allows multiple selections, so that a user may choose all, none, some, or just one of the types of links (paths) that should be included in pipeline execution. User-defined types may also be displayed in Links submenu 405. A user may configure runtime parameters from parameters submenu 410. Parameters submenu 410 is dynamically populated based on system information and the executable code content of the nodes in the pipeline. The runtime parameters include a key describing the parameter, which is displayed in a key field 415, 420, 425, 430, 435 of parameters submenu 410, and an associated value of the parameter, which is displayed in a value field 440, 445, 450, 455, 460 of parameters submenu 410. The runtime parameters include both execution parameters, which may be displayed in an execution parameters division 465 of parameters submenu 410, and system parameters, which may be displayed in a system parameters division 475.

The system parameters and their values are retrieved from workspace or other system metadata, and pre-populated into the fields of system parameters division 475. The system parameters are available by default in all runs, whether or not they are used by the pipeline. The key names of the system parameters are not editable through key fields 425, 430, 435, while the pre-populated system parameter values may be changed by the user through value fields 450, 455, 460 for the subsequent execution of the pipeline that may be commenced in response to user selection of execute button 475.

The execution parameters are retrieved by parsing the executable code associated with nodes of the pipeline that are indicated by the selected paths chosen in links submenu 405. The executable code for the nodes in the selected paths is parsed to detect the execution parameters. In the code, execution parameters have the following format: [$KeyName]. The code is parsed to detect this format, and where it is detected, an execution parameter with the key name "KeyName" is added to the execution parameters. In this way, the executable code of the nodes in the execution set is parsed to extract the set of execution parameters for the pipeline.

Because the execution parameters division 465 is dynamically populated, selection of additional type(s) of paths from links submenu 405, such as by checking experimentation box 480, causes key and value fields for any additional execution parameters detected in the underlying code of the selected additional type(s) of paths to be displayed in execution parameters division 465. Similarly, de-selection of type(s) of paths from links submenu 405, such as by un-checking training box 485, causes key and value fields (such as fields 415, 420, 440, 445) for execution parameters detected only in the code for training paths of the pipeline to be removed from execution parameters division 465. So, for example, where the user selects experimentation 480 in addition to or instead of training, execution parameters division 465 will be changed to present additional execution parameters for the experimentation paths (or workflows) of the pipeline. Where the user deselects training 485, the parameter fields for the training paths (or workflows) of the pipeline will disappear from execution parameters division 465 if these parameters are not used in other selected types of path. The parameter key name field 415, 420 is pre-populated, based on the parameter KeyName detected during the parse of the executable code. The pre-populated key names are user-editable through fields 415, 420. The parameter values are not pre-populated, and are requested as user input at value fields 440, 445. Menu 400 shows value fields 440, 445 after a user has entered values. Additional execution parameters may be added by selecting add parameters button 490. User selection of execute button 475 initiates execution of the default (common) and selected paths of the pipeline using the values of the system and execution parameters entered in value fields 440, 445, 450, 455, 460.

In one embodiment, once the pipeline is deployed for automated execution, for example in a production environment, execution parameter values may be provided by the application requesting execution of the pipeline, for example in an API request for execution of the pipeline. In one embodiment, execution parameter values may be stored and later retrieved at runtime for the pipeline.

Automated Identification of Nodes for Execution Based on Link Type

In one embodiment, each step of computer-implemented methods described herein may be performed by a processor (such as processor 710 as shown and described with reference to FIG. 7) of one or more computing devices (i) accessing memory (such as memory 715 and/or other computing device components shown and described with reference to FIG. 7) and (ii) configured with logic to cause the system to execute the step of the method (such as unified pipeline flow with common and phase-specific paths logic 730 shown and described with reference to FIG. 7). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 715, or storage/disks 735 of computing device 705 or remote computers 765 shown and described with reference to FIG. 7, or in data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 5:
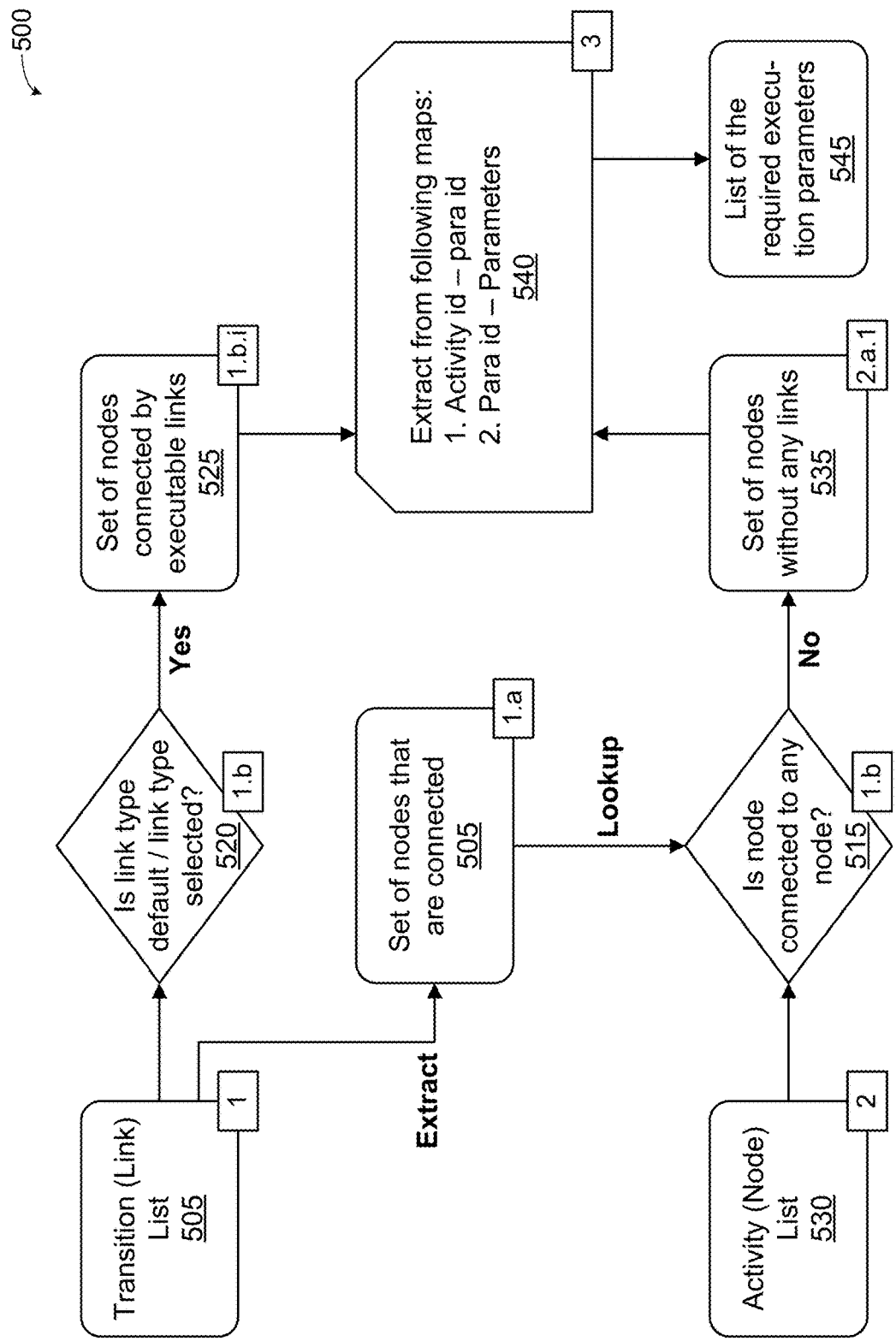
FIG. 5 illustrates one embodiment of a method for determining nodes of a pipeline to be executed based on a user's choice of link types associated with unified pipeline flow with common and phase-specific paths.

FIG. 5 illustrates one embodiment of a method 500 for determining nodes of a pipeline to be executed based on a user's choice of link types associated with unified pipeline flow with common and phase-specific paths. In one embodiment, the nodes to be executed are those connected to links of a type associated with the deployment phase selected by the user, for example, experimentation-type links, training-type links, and scoring-type links. In one embodiment, nodes that are not connected to other nodes (occasionally referred to as independent blobs) are also included in the nodes to be executed. In one embodiment, nodes connected with a default link type are also included in the nodes to be executed. The default link type is automatically assigned at creation of a connector between nodes, and need not be explicitly provided by users before or at execution time.

In one embodiment, at step 505, all link information—including link origin node, link destination node, and phase type of the link—are stored in a list data structure, which may be referred to as a "transition list" or "link list." In one embodiment, this list is part of a graph data structure that defines a pipeline. In one embodiment, at step 510, a set of nodes that are connected to any other node is extracted from the transition list. The set of connected nodes is stored for further use in identifying non-connected nodes at step 515. In one embodiment, at step 520, for each transition in the transition list, the phase type of the link is checked to determine whether the phase type of the link is of the default type of the type selected for execution (for example, a "training"-type link). Where the phase type of the link is the default type or the type selected for execution, at step 525, the nodes that are bound to the link (the "to" or destination node and the "from" or origin node) are added to a set of nodes that are to be executed (also referred to as a set of nodes connected by executable links). The set of nodes to be executed is stored for further use.

In one embodiment, at step 530, information for all the nodes available in the pipeline are stored in a list data structure, which may be referred to as an "activity list" or a "node list." In one embodiment, this list is part of a graph data structure that defines a pipeline. In one embodiment, at step 515, for each node (activity) in the activity list, the node is checked to determine whether its is connected or not by comparing the node with the set of connected nodes constructed at step 510. Where the node is not a connected node, at step 535, the nodes that are not connected by any links (referred to herein as "independent blobs" or "non-connected nodes" of the pipeline) are added to a set of nodes without any links. The set of nodes without any links is stored for further use.

At this stage, two sets of nodes that are executable have been identified: (i) the set of nodes connected by executable links created at step 525, and (ii) the set of nodes without any links created at step 535. In one embodiment, at step 540, runtime parameters (if any are available) are extracted from the underlying executable code (such as a notebook paragraph) that defines the functionality of the node. To find runtime parameter sets from the sets of nodes that are to be executed, two mappings are performed: a node identifier to paragraph identifier mapping, and a paragraph identifier to parameter mapping. These mappings are performed on both sets of nodes (the set of nodes connected by executable links, and the set of nodes without any links) to extract the runtime parameters held in the notebook paragraphs underlying the nodes. At step 545, the list of runtime parameters needed for execution of the two sets of nodes is compiled and stored for further use.

Example Method

Figure 6:
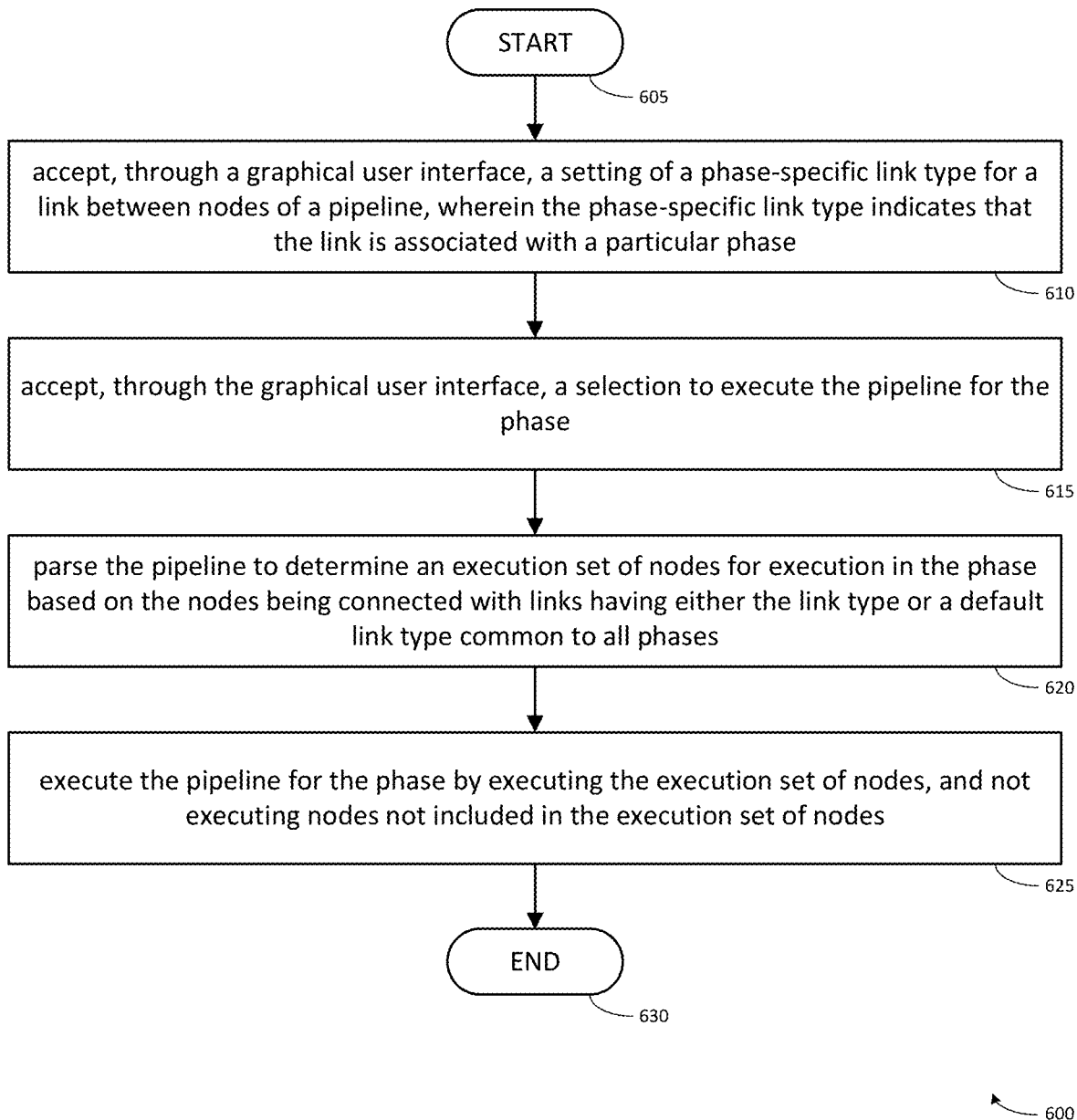
FIG. 6 illustrates one embodiment of a method associated with associated with unified pipeline flow with common and phase-specific paths.

FIG. 6 illustrates one embodiment of a method 600 associated with associated with unified pipeline flow with common and phase-specific paths. In one embodiment, the steps of method 600 are performed by unified pipeline flow subsystem 170 (as shown and described with reference to FIG. 1). In one embodiment, unified pipeline flow subsystem 170 is a special purpose computing device (such as computing device 705) configured with unified pipeline flow with common and phase-specific paths logic 730. In one embodiment, unified pipeline flow subsystem 170 is a module of a special purpose computing device configured with logic 730. In one embodiment, code-free phase-specific forking of a pipeline in real time at runtime is enabled by the steps of method 600, where such real time phase-specific forking was not previously possible to be performed by computing devices.

The method 600 may be initiated automatically based on various triggers, such as in response to receiving a signal over a network or parsing stored data indicating that (i) a user (or administrator) of system 105 has initiated method 600, (ii) that method 600 is scheduled to be initiated at defined times or time intervals, (iii) that an execute pipeline option has been selected by a user (or administrator of system 105), or (iv) an external application has requested execution of the pipeline. The method 600 initiates at START block 605 in response to parsing a signal received or stored data retrieved and determining that the signal or stored data indicates that the method 600 should begin. Processing continues to process block 610.

At process block 610, the processor accepts, through a graphical user interface, a setting of a phase-specific link type for a link between nodes of a pipeline. The phase-specific link type indicates that the link is associated with a particular phase. In one embodiment, a user accesses a GUI such as GUI 200 using a client computing device 145, 150, 155, 160, and selects a link (such as link 223) by clicking on the link. The user is presented with a menu in the GUI from which the user may select a phase-specific link type, for example one of an experimentation, training, scoring, or user-defined link type. The user selects a link type for a particular phase. The processor then updates the link type in the table or list of links for the pipeline to be of the selected link type, thereby setting the selected link (such as link 223) to be associated with the particular phase. Once the processor has thus completed accepting, through a graphical user interface, a setting of a phase-specific link type for a link between nodes of a pipeline, where the phase-specific link type indicates that the link is associated with a particular phase, processing at process block 610 completes, and processing continues to process block 615.

At process block 615, the processor accepts, through the graphical user interface, a selection to execute the pipeline for the phase. In one embodiment a user accesses a GUI such as GUI 200 or menu 400 using a client computing device 145, 150, 155, 160, and enters a selection (such as the check box for the training execution path 280 training check box 485) of the particular phase for execution. The processor stores this selection to use in identification of paths and nodes to execute. The user then selects a run or execute button, such as button 250 or button 475. The processor accepts the selection, and in response, proceeds to the next step in advance of executing the pipeline paths associated with the phase. Once the processor has thus completed accepting, through the graphical user interface, a selection to execute the pipeline for the phase, processing at process block 615 completes, and processing continues to process block 620.

At process block 620, the processor parses the pipeline to determine an execution set of nodes for execution in the phase based on the nodes being connected with links having either the link type or a default link type common to all phases. In one embodiment, in response to the selection of the run or execute button, the processor searches the pipeline for nodes associated with the phase-specific paths (those links having a link type property associated with the phase) and the common paths (those links having a default link type property). In one embodiment, the processor determines, from the link list of links in the pipeline, a set of phase-specific links having either the phase specific link type or the default link type. The processor then identifies the nodes connected to those phase specific links. The processor then includes those nodes connected by the set of phase-specific links in the execution set of nodes, for example by writing the nodes for execution to a table or list of nodes to be executed, or by setting a flag by each entry in the nodes list indicating membership (or lack thereof) in the execution set. In one embodiment, the processor further identifies independent blobs of the pipeline (nodes of the pipeline that are not connected to other nodes). In one embodiment, the processor extracts from the link list a set of connected nodes that are connected by the links of the link list, for example by parsing the link list to identify values of origin and destination node properties of the link, and adding the identified nodes to the set of connected nodes. The processor compares the set of connected nodes with a node list of nodes in the pipeline to determine a set of non-connected nodes in the pipeline that are not linked, for example by searching the node IDs of the set of connected nodes for the node IDs of nodes in the node list. Where no match is found, the node is added to the set of non-connected nodes. The processor then includes the non-connected nodes in the execution set of nodes, for example by writing the non-connected nodes for execution to the table or list of nodes to be executed, or by setting the flag by the entries for the non-connected nodes indicating membership in the execution set. Once the processor has thus completed parsing the pipeline to determine an execution set of nodes for execution in the phase based on the nodes being connected with links having either the link type or a default link type common to all phases, processing at process block 620 completes, and processing continues to process block 625.

At process block 625, the processor executes the pipeline for the phase by executing the execution set of nodes, and not executing nodes not included in the execution set of nodes. In one embodiment, the processor accesses the executable code for the nodes included in the execution set, and causes it to be executed, for example by making an API request to execute a notebook paragraph including the executable code. No API request to execute code associated with the nodes not included in the execution set is made. In one embodiment, the processor then executes the executable code, for example by implementing the processes of a notebook kernel configured to interpret and execute the notebook paragraphs associated with the nodes included in the execution set. The processor thus causes the functionality of the phase-specific and common pipeline paths to be executed. Once the processor has thus completed executing the pipeline for the phase by executing the execution set of nodes, and not executing nodes not included in the set of nodes, processing at process block 625 completes, and processing continues to END block 630, where process 600 ends.

In one embodiment, the processor further parses the executable code of the nodes in the execution set to extract a set of execution parameters for the pipeline, for example as shown in and described above with reference to FIG. 4.

In one embodiment, the processor further determines whether a workspace in which the pipeline is deployed is a sandbox workspace or a production workspace, for example by retrieving attributes of the workspace, parsing the attributes to identify an attribute that indicates the sandbox/production status, and using the value of that attribute to state which type (sandbox or production) the workspace is. In one embodiment, the processor further automatically disables execution of scoring paths of the pipeline where the pipeline is deployed in a sandbox workspace and automatically disables execution of training paths and experimentation paths of the pipeline where the pipeline is deployed in a production workspace, for example by pre-setting the selections in phase menu 275 and links submenu 405. (In one embodiment, phase menu 275 and links submenu 405 both access and manipulate the same settings, although in different locations within the GUI). In one embodiment, this is performed as shown in and described with reference to FIG. 3.

In one embodiment, the processor further accepts input defining a workspace data source to be a connection to a specific data source, and during execution of the pipeline, executes a node that requests data from the workspace data source, and retrieves the requested data from the specific data source, for example using workspace data source definitions and hooks as shown in and described with reference to FIG. 3.

In one embodiment, the processor further displays links of the phase-specific link type in a color or pattern distinct from links of other link types in the graphical user interface, for example by automatically selecting a color or pattern to associate uniquely with the phase-specific link type among all link types, and rendering links of the phase-specific link type in that color or pattern, for example as shown in and described with reference to FIG. 2A. In one embodiment, the processor further displays links of the phase-specific link type and nodes of the execution set of nodes with a highlight in the graphical user interface, for example by automatically selecting a highlight color, and rendering at least the nodes in the execution set in the highlight color, for example as shown in and described with reference to FIG. 2B.

Selected Advantages

In one embodiment, the systems, methods, and other embodiments described herein for unified pipeline flow with common and phase-specific paths overcomes the need for code-heavy forking of pipeline paths. Absent the systems, methods, and other embodiments described herein, any forking is handled by conditional scripts in the executable code of the nodes, for example by case or if-else statements that indicate whether or not to execute a node based on runtime parameters. The data-scientist must prepare this code correctly, and it the forking may not be visible in pipeline GUI. Further, code-based forking is not readily updatable, if for instance, users wish to add an additional experimentation or what-if analysis path to the pipeline, new case or if-else statements must be written, and existing statements may need to be modified. In the systems, methods, and other embodiments described herein for unified pipeline flow with common and phase-specific paths, the forking is dictated by link types in the pipeline design, and needs no additional code. The executable code for the nodes need only handle the discrete functionality of the node, without code for forking based on deployment phase, and the decision of whether to execute or not is dictated by the link types between nodes that are assigned in a pipeline GUI.

In one embodiment, the systems, methods, and other embodiments described herein for unified pipeline flow with common and phase-specific paths overcomes lack of unified design paradigm in pipeline GUI representations. Pipeline development need no longer have separate pipelines for separate phase that duplicate nodes used in common for multiple phases. The systems, methods, and other embodiments described herein enable phase-dependent forking within a single pipeline, enhancing auditability and understandability as described elsewhere herein.

In one embodiment, the systems, methods, and other embodiments described herein for unified pipeline flow with common and phase-specific paths enable real-time monitoring at all stages of the pipeline; enable introspection and explainability of the operation of the model by maintaining training, experimentation, and other paths used to develop the model workflow introspection in one pipeline, and by showing discrete steps of the model as nodes in the pipeline.

In one embodiment, the systems, methods, and other embodiments described herein for unified pipeline flow with common and phase-specific paths enable a deployment process that is applicable across all deployment phases, in all workspaces, with a high degree of automation. Due to unifying phase-specific paths in a pipeline that forks based on deployment phase, and automatic selection of data sources based on workspace, the pipeline may be deployed as-is, without modification into any sandbox or production workspace. Further, based on workspace type (such as sandbox/production), certain pipeline paths are enabled or disabled automatically, as discussed above, eliminating deployment configuration steps. The need for re-configuration and re-validation of the model following deployment is eliminated, and promotion of a model from sandbox to production is seamless.

These and other advantages are enabled by the systems, methods, and other embodiments described herein for unified pipeline flow with common and phase-specific paths.

Software Module Embodiments

Software instructions may be designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (such as system 100) includes a computing/data processing system including a computing application or collection of distributed computing applications (such as pipeline interface 165 to a data integration and modeling service 120) for access and use by other client computing devices associated with an enterprise (such as the client devices 145, 150, 155 and 160 of enterprise network 115). The system and client computing devices communicate with each other over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system implements a centralized server-side application that provides at least one or more of the functions disclosed herein and a graphical user interface to access and operate them, and that is accessed by many users through computing devices/terminals communicating with the present computing system (functioning as the server) over a computer network. In one embodiment, cloud infrastructure system 105 (including data integration and modeling service 120) may be implemented on on-premises infrastructure, such as a set of one or more dedicated servers. In one embodiment the present system provides at least one or more of the functions disclosed herein and a graphical user interface to access and operate the functions.

Computing Device Embodiment

Figure 7:
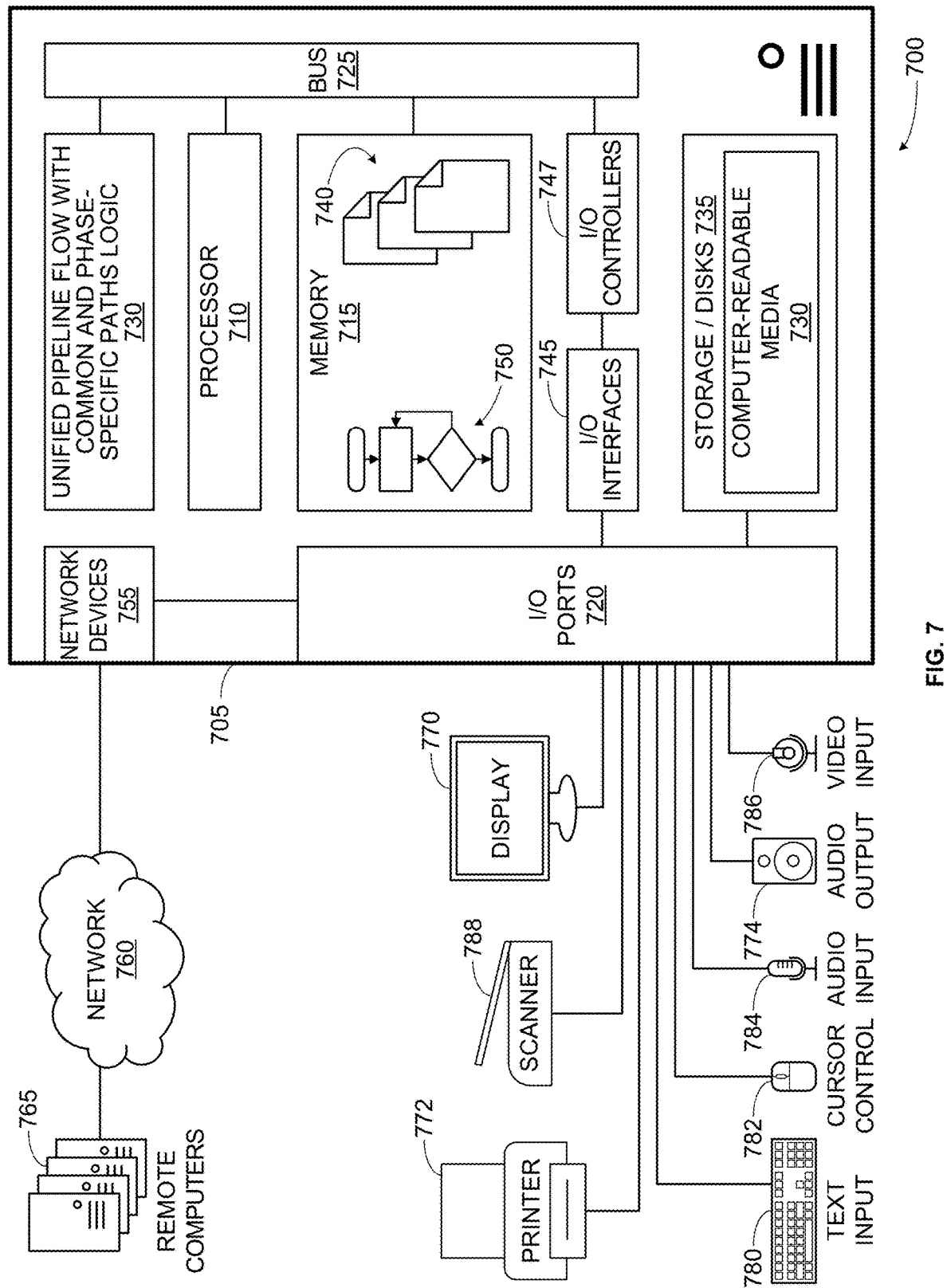
FIG. 7 illustrates an embodiment of a computing system configured with the example systems and/or methods disclosed.

FIG. 7 illustrates an example computing device 700 that is configured and/or programmed as a special purpose computing device with one or more of the example systems and methods described herein, and/or equivalents. The example computing device 700 may be a computer 705 that includes at least one hardware processor 710, a memory 715, and input/output ports 720 operably connected by a bus 725. In one example, the computer 705 may include unified pipeline flow with common and phase-specific paths logic 730 configured to facilitate automatic two-way generation and synchronization of notebook and pipeline similar to the logic, systems, methods, and other embodiments shown in and described with reference to FIGS. 1-6.

In different examples, the logic 730 may be implemented in hardware, a non-transitory computer-readable medium 737 with stored instructions, firmware, and/or combinations thereof. While the logic 730 is illustrated as a discrete hardware component attached to the bus 725, it is to be appreciated that in other embodiments, the logic 730 could be implemented in the processor 710, stored in memory 715, or stored in disk 735.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate automatic two-way generation and synchronization of notebook and pipeline. The means may also be implemented as stored computer executable instructions that are presented to computer 705 as data 740 that are temporarily stored in memory 715 and then executed by processor 710.

Logic 730 may also provide means (e.g., hardware, non-transitory computer-readable medium that stores executable instructions, firmware) for performing automatic two-way generation and synchronization of notebook and pipeline.

Generally describing an example configuration of the computer 705, the processor 710 may be a variety of various processors including dual microprocessor and other multi-processor architectures. A memory 715 may include volatile memory and/or non-volatile memory. Non-volatile memory may include, for example, ROM, PROM, and so on. Volatile memory may include, for example, RAM, SRAM, DRAM, and so on.

A storage disk 735 may be operably connected to the computer 705 via, for example, an input/output (I/O) interface (e.g., card, device) 745 and an input/output port 720 that are controlled by at least an input/output (I/O) controller 747. The disk 735 may be, for example, a magnetic disk drive, a solid state drive (SSD), a floppy disk drive, a tape drive, a Zip drive, a flash memory card, a memory stick, and so on. Furthermore, the disk 735 may be an optical drive, such as a CD-ROM drive, a CD-R drive, a CD-RW drive, a DVD ROM, and so on. The memory 715 can store a process 750 and/or a data 740, for example. The disk 735 and/or the memory 715 can store an operating system that controls and allocates resources of the computer 705.

The computer 705 may interact with, control, and/or be controlled by input/output (I/O) devices via the input/output (I/O) controller 747, the I/O interfaces 745, and the input/output ports 720. Input/output devices may include, for example, one or more displays 770, printers 772 (such as inkjet, laser, or 3D printers), audio output devices 774 (such as speakers or headphones), text input devices 780 (such as keyboards), cursor control devices 782 for pointing and selection inputs (such as mice, trackballs, touch screens, joysticks, pointing sticks, electronic styluses, electronic pen tablets), audio input devices 784 (such as microphones or external audio players), video input devices 786 (such as video and still cameras, or external video players), image scanners 788, video cards (not shown), disks 735, network devices 755, and so on. The input/output ports 720 may include, for example, serial ports, parallel ports, and USB ports.

The computer 705 can operate in a network environment and thus may be connected to the network devices 755 via the I/O interfaces 745, and/or the I/O ports 720. Through the network devices 755, the computer 705 may interact with a network 760. Through the network, the computer 705 may be logically connected to remote computers 765. Networks with which the computer 705 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Acronyms and initialisms used herein have the following meanings:
API: application programming interface;
ASIC: application-specific integrated circuit;
CD: compact disk;
CD-R: CD recordable;
CD-RW: CD rewriteable;
CPU: central processing unit;
CRUD: create, read, update, delete;
DRAM: dynamic RAM;
DVD: digital versatile disk and/or digital video disk;
GPU: graphics processing unit;
GUI: graphical user interface;
HDD: hard disk drive;
HPC: high-performance computing;
I/O: input/output;
IAAS: infrastructure-as-a-service;
ID: identifier;
JDBC: Java database connectivity;
JSON: JavaScript object notation;
LAN: local area network;
ML: machine learning;
MMG: Model Management and Governance;
NAS: network-attached storage;
OFSAA: Oracle Financial Services Analytical Applications;
OS: operating system;
PAAS: platform-as-a-service;
PGQL: property graph query language;
PGX: property graph server;
PROM: programmable ROM;
RAM: random access memory;
REST: representational state transfer;
ROM: read only memory;
SAAS: software-as-a-service;
SOAP: simple object access protocol
SQL: structured query language;
SRAM: synchronous RAM;
SSD: solid-state storage device;
TCP/IP: Transmission Control Protocol/Internet Protocol
USB: universal serial bus;
WAN: wide area network; and
XML: extensible markup language.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media.

Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
   accept, through a graphical user interface, user input to designate a phase-specific link type for individual links between nodes of a pipeline, wherein the phase-specific link types associate a link with a particular phase of deployment of the pipeline that is one of a scoring phase, a training phase, and an experimentation phase;
   accept, through the graphical user interface, a selection of a selected phase to execute the pipeline for one of the scoring phase, the training phase, or the experimentation phase;
   parse the pipeline to determine an execution set of nodes for execution in the selected phase based on the nodes being connected with links having either the phase-specific link type for the selected phase or a default link type that is associated with all phases, wherein association with the selected phase by the link type of the links that connect the nodes is a basis for inclusion of the nodes in the execution set;
   and
   execute the pipeline for the selected phase by executing the execution set of nodes, and not executing nodes not included in the execution set of nodes.

2. The non-transitory computer-readable medium of claim 1, wherein the instructions for determination of the execution set of nodes further comprises instructions that when executed by at least the processor cause the computer to:
   determine, from a link list of links in the pipeline, a set of phase-specific links having either the phase-specific link type for the selected phase or the default link type; and
   include those nodes connected by the set of phase-specific links in the execution set of nodes.

3. The non-transitory computer-readable medium of claim 2, wherein the instructions for determination of the execution set of nodes further comprises instructions that when executed by at least the processor cause the computer to:
   extract from the link list a set of connected nodes that are connected by the links of the link list;
   compare the set of connected nodes with a node list of nodes in the pipeline to determine a set of non-connected nodes in the pipeline that are not linked; and
   include the non-connected nodes in the execution set of nodes.

4. The non-transitory computer-readable medium of claim 1, wherein the instructions further comprise instructions that when executed by at least the processor cause the computer to:
   parse the executable code of the nodes in the execution set to extract a set of execution parameters for the pipeline that are specific to the selected phase; and
   dynamically populate an execution parameters division of the graphical user interface with key-value pairs of the set of execution parameters.

5. The non-transitory computer-readable medium of claim 1, wherein the instructions further comprise instructions that when executed by at least the processor cause the computer to:
   determine whether a workspace in which the pipeline is deployed is a sandbox workspace or a production workspace; and
   automatically disable execution of scoring paths of the pipeline where the pipeline is deployed in the sandbox workspace and automatically disable execution of training paths and experimentation paths of the pipeline where the pipeline is deployed in the production workspace.

6. The non-transitory computer-readable medium of claim 1, wherein the instructions further comprise instructions that when executed by at least the processor cause the computer to:
   accept input defining a workspace data source to be a connection to a specific data source; and
   during execution of the pipeline, execute a node that requests data from the workspace data source, and retrieve the requested data from the specific data source.

7. A computing system, comprising:
   at least one processor connected to at least one memory;
   a non-transitory computer readable medium including instructions stored thereon that when executed by at least the processor cause the processor to:
   accept, through a graphical user interface, a setting of phase-specific link types for individual links between nodes of a pipeline, wherein the phase-specific link types associate a link with a particular phase of deployment of the pipeline that is one of a scoring phase, a training phase, an experimentation phase, and a user-defined phase;
   accept, through the graphical user interface, a selection of a selected phase to execute the pipeline for one of the scoring phase, the training phase, the experimentation phase, or the user-defined phase;
   parse the pipeline to determine an execution set of nodes for execution in the selected phase based on the nodes being connected with links having either the phase-specific link type for the selected phase or a default link type that is associated with all phases, wherein association with the selected phase by the link type of the links that connect the nodes is a basis for inclusion of the nodes in the execution set;
   and
   execute the pipeline for the selected phase by executing the execution set of nodes, and not executing nodes not included in the execution set of nodes.

8. The computing system of claim 7, wherein the instructions that cause determination of the execution set of nodes further comprises instructions that when executed by at least the processor cause the computing system to:
- determine, from a link list of links in the pipeline, a set of phase-specific links having either the phase-specific link type for the selected phase or the default link type; and
- include those nodes connected by the set of phase-specific links in the execution set of nodes.

9. The computing system of claim 8, wherein the instructions that cause determination of the execution set of nodes further comprises instructions that when executed by at least the processor cause the computing system to:
- extract from the link list a set of connected nodes that are connected by the links of the link list;
- compare the set of connected nodes with a node list of nodes in the pipeline to determine a set of non-connected nodes in the pipeline that are not linked; and
- include the non-connected nodes in the execution set of nodes.

10. The computing system of claim 7, wherein the instructions further comprise instructions that when executed by at least the processor cause the computing system to parse the executable code of the nodes in the execution set to extract a set of execution parameters for the pipeline.

11. The computing system of claim 7, wherein the instructions further comprise instructions that when executed by at least the processor cause the computing system to:
- determine whether a type of a workspace in which the pipeline is deployed is a sandbox workspace or a production workspace; and
- automatically disable execution of scoring paths of the pipeline where the pipeline is deployed in the sandbox workspace and automatically disable execution of training paths and experimentation paths of the pipeline where the pipeline is deployed in the production workspace.

12. The computing system of claim 7, wherein the instructions further comprise instructions that when executed by at least the processor cause the computing system to:
- accept input defining a workspace data source to be a connection to a specific data source; and
- during execution of the pipeline, execute a node that requests data from the workspace data source, retrieve the requested data from the specific data source.

13. The computing system of claim 7, wherein the nodes represent discrete tasks of a computing application assembled by the pipeline.

14. A computer-implemented method, comprising:
- accepting, through a graphical user interface, a setting of a phase-specific link type for a link between nodes of a pipeline, wherein the phase-specific link type indicates that the link is associated with a particular phase of deployment of the pipeline that is one of a scoring phase, a training phase, and an experimentation phase;
- determining whether a workspace in which the pipeline is deployed is a sandbox workspace or a production workspace;
- automatically disabling execution of scoring paths of the pipeline associated with the scoring phase by the phase specific link type where the pipeline is deployed in the sandbox workspace and automatically disabling execution of training paths and experimentation paths of the pipeline associated with the training and experimentation phases by the phase-specific link type where the pipeline is deployed in the production workspace;
- accepting, through the graphical user interface, a selection to execute the pipeline for the particular phase in the workspace;
- parsing the pipeline to determine an execution set of nodes for execution in the particular phase based on the nodes being connected with links having either the link type or a default link type common to all phases; and
- executing the pipeline for the particular phase by executing the execution set of nodes, and not executing nodes not included in the execution set of nodes.

15. The computer-implemented method of claim 14, wherein the determination of the execution set of nodes further comprises:
- determining, from a link list of links in the pipeline, a set of phase-specific links having either the phase-specific link type for the particular phase or the default link type; and
- including those nodes connected by the set of phase-specific links in the execution set of nodes.

16. The computer-implemented method of claim 15, wherein the determination of the set of nodes further comprises:
- extract from the link list a set of connected nodes that are connected by the links of the link list;
- compare the set of connected nodes with a node list of nodes in the pipeline to determine a set of non-connected nodes in the pipeline that are not linked; and
- include the non-connected nodes in the execution set of nodes.

17. The computer-implemented method of claim 14, further comprising parsing the executable code of the nodes in the execution set to extract a set of execution parameters for the pipeline.

18. The computer-implemented method of claim 14, further comprising:
- accepting input defining a workspace data source to be a connection to a specific data source; and
- during execution of the pipeline, executing a node that requests data from the workspace data source, retrieving the requested data from the specific data source.

19. The computer-implemented method of claim 14, further comprising displaying, in the graphical user interface, links of the phase-specific link type in a color or pattern distinct from links of other link types.

20. The computer-implemented method of claim 14, further comprising displaying, in the graphical user interface, links of the phase-specific link type and nodes of the execution set of nodes with a highlight.

* * * * *